(12) United States Patent
Böhm

(10) Patent No.: US 7,600,989 B2
(45) Date of Patent: Oct. 13, 2009

(54) LEAK DETECTOR COMPRISING AN INLET

(75) Inventor: Thomas Böhm, Köln (DE)

(73) Assignee: Inficon GmbH (DE)

( * ) Notice: Subject to any disclaimer, the term of this patent is extended or adjusted under 35 U.S.C. 154(b) by 767 days.

(21) Appl. No.: 10/542,817

(22) PCT Filed: Jan. 13, 2004

(86) PCT No.: PCT/EP2004/000161

§ 371 (c)(1),
(2), (4) Date: Jul. 20, 2005

(87) PCT Pub. No.: WO2004/068099

PCT Pub. Date: Aug. 12, 2004

(65) Prior Publication Data

US 2006/0034702 A1 Feb. 16, 2006

(30) Foreign Application Priority Data

Jan. 25, 2003 (DE) .................... 103 02 987

(51) Int. Cl.
*F04B 35/04* (2006.01)
*G01M 3/04* (2006.01)
(52) U.S. Cl. .............. 417/423.4; 73/40; 73/40.7
(58) Field of Classification Search .......... 417/53, 417/423.4; 73/40.7, 40
See application file for complete search history.

(56) References Cited

U.S. PATENT DOCUMENTS

| 4,472,962 A | * | 9/1984 | Mennenga .................. 73/40.7 |
| 5,561,240 A | * | 10/1996 | Ochiai et al. ................ 73/40.7 |
| 5,585,548 A | | 12/1996 | Grosse Bley et al. |
| 5,707,213 A | | 1/1998 | Conrad |
| 5,708,194 A | | 1/1998 | Bohm et al. |
| 7,082,813 B2 | * | 8/2006 | Grosse-Bley et al. ........ 73/40.7 |

FOREIGN PATENT DOCUMENTS

| DE | 31 24 205 A1 | 12/1982 |
| DE | 42 28 313 A1 | 3/1994 |

* cited by examiner

*Primary Examiner*—Charles G Freay
*Assistant Examiner*—Patrick Hamo
(74) *Attorney, Agent, or Firm*—Mariama Muldoon Blasiak & Sullivan LLP

(57) ABSTRACT

A leak detector includes an inlet, a high-vacuum pump, and a test gas detector, which is connected to the entry of the high-vacuum pump. A backing pump is connected to an outlet area of the high-vacuum pump, and a test gas line extends between the inlet of the leak detector and the backing pump, the test gas line being connected to the outlet area of the high-vacuum pump via a line section. In order to shorten the response time of the leak detector, the line and the backing pump are connected via separate connections to the outlet area of the high-vacuum pump.

19 Claims, 3 Drawing Sheets

LEAK DETECTOR COMPRISING AN INLET

FIELD OF THE INVENTION

The present invention relates to a leak detector.

BACKGROUND OF THE INVENTION

Leak detectors are known from publications DE-C2 31 24 205, DE-A1 42 28 313 and DE-A1 195 23 430. These are counterflow leak detectors which are commonly operated with helium as the test gas. During leak detection operation, the gas which in the instance of a defective device under test contains the test gas, flows through a line from the inlet of the leak detector to the backing pump. This line is connected through line sections to at least the outlet area of the high-vacuum pump, preferably also with a pressure stage. Depending on which of the line sections is open, leak detection is performed at a different sensitivities.

Generally there exists the problem where in the instance of leak detectors of this kind the response time, i.e. the time which elapses from the point of time when the test gas enters into the inlet of the leak detector until the point of time when the test gas is recorded, is relatively long and specifically so at higher pressures. From EP-B1 752 095 a leak detector is known where its inlet is connected via a test gas line to a gas supply pump. For the connection of the test gas line to the outlet area of the high-vacuum pump, a connection port equipped with a coaxial line is provided. Such a solution is design-wise involved and offers only a limited conductivity.

SUMMARY OF THE INVENTION

It is the task of the present invention to attain the desired reduction in the response time in the instance of counterflow leak detection within the upper pressure range by a more simple solution.

This task is solved in accordance with the present invention.

In that in the instance of a defective device under test, the entire test gas containing gas flows through the outlet area of the high-vacuum pump (respectively through a pressure stage) the path across which the test gas needs to diffuse is reduced thereby reducing the response time to a minimum.

BRIEF DESCRIPTION OF THE DRAWINGS

Further advantages and details of the present invention shall be explained with reference to the examples of embodiments depicted schematically in the drawing in which.

DETAILED DESCRIPTION

Figure 1:
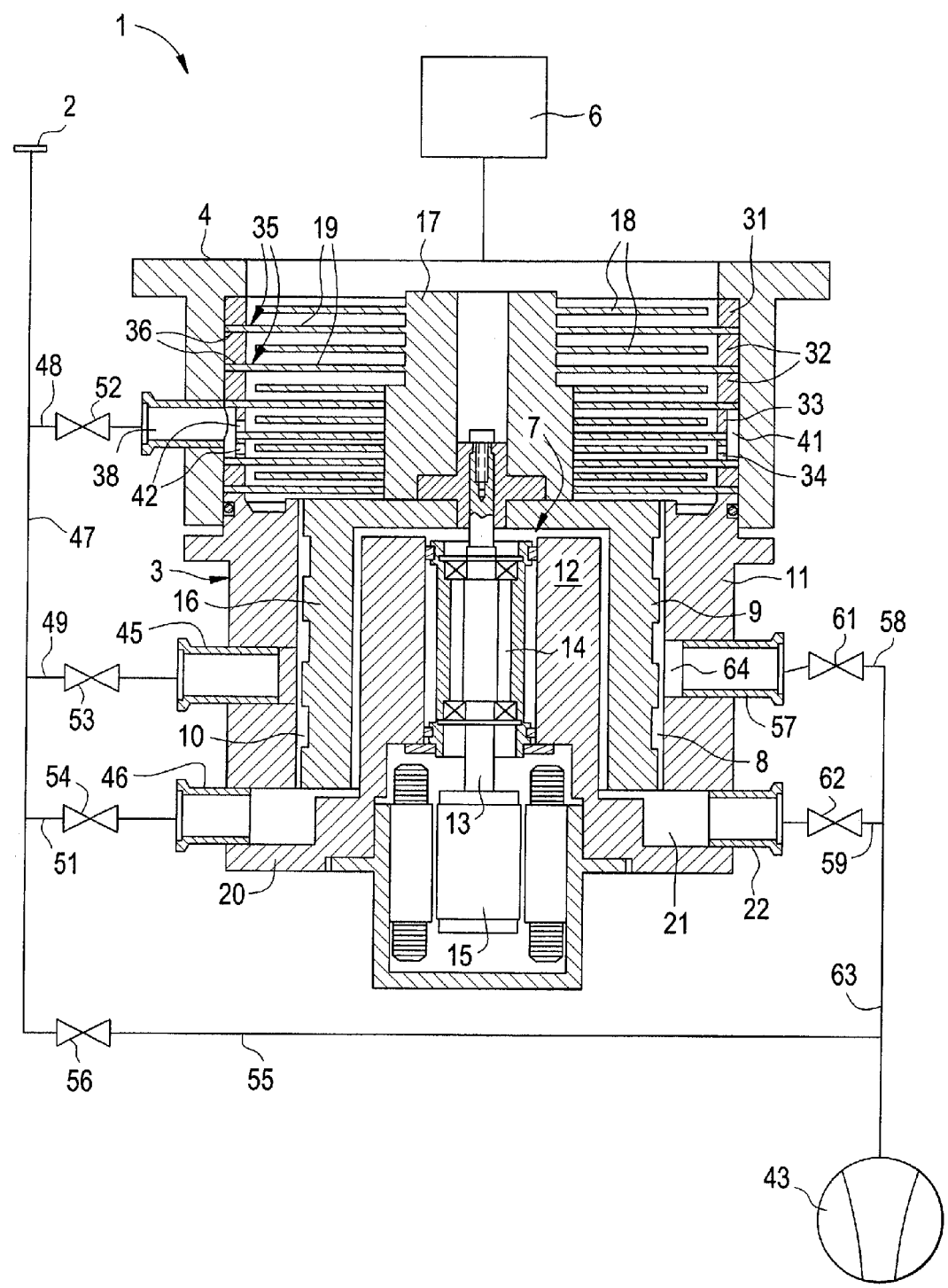
FIG. 1 depicts a leak detector with a high-vacuum pump designed by way of a compound pump, the molecular pumping stage which is of a single stage design.

Components of the depicted leak detectors 1 with their inlet 2, are the high-vacuum pump 3 designed by way of a compound drag pump. Compound drag pump means that it is equipped with a turbomolecular pumping stage and a molecular pumping stage. Preferably pumps of this kind are of a single flow design, i.e. their stages are arranged axially the one after the other in the direction of the pumping action.

The outer housing of the high-vacuum pump 3 is designated as 11. Said housing is equipped with a central bearing bushing 12 projecting towards the inside in which a shaft 13 is supported by means of a spindle bearing 14, for example. Linked to the shaft 13 are the drive motor 15, the rotor 16 of a molecular pumping stage as well as the rotor 17 of a turbomolecular pumping stage. Basis of the pump is a chassis 20, which supports the housing 11, the bearing bushing 12 and the stator of the drive motor 15.

The rotor 17 is equipped with the rotor blades 18, which jointly with the stator blades 19 mounted in the housing 11 form the turbomolecular pumping stage. By means of the flange 4, the pump is connected to the test gas detector 6 depicted only schematically, which commonly is a mass spectrometer.

In the example of the embodiment in accordance with drawing FIG. 1, the molecular pump (respectively pumping stage) comprises the bell-shaped rotor 16 spanning the motor/bearing chamber 7, said rotor 16 being equipped on its outside with thread-like grooves 8 in which during operation of the pump the gas is conveyed from the high-vacuum side to the forevacuum side. Assigned to the rotor 16 is a stator 9 of approximately the same axial length. Located between the stator 9 and the rotor 16 is the gap 10. This needs to be as small as possible so as to attain a good seal between the thread grooves. Connected to the forevacuum chamber 21 is the forevacuum port 22. The backing pump is designated as 43.

To the stator 31 of the turbomolecular pumping stage 18/19 there are assigned the rotor blades 19 and the spacing rings 32 to 34. The stator blades 19 are, in a basically known manner, components of blade rings or blade ring sections 35 with outer rims 36, which in the mounted state of the stator are located between the spacing rings. The stator made of alternatingly arranged spacing rings 32 and blade rings 35 above each other, is centred through the outer housing 11.

In drawing FIG. 1, a compound pump is depicted as an example which pumps the taken in gases (inlet flange 4) along the longitudinal axis of the pump in a single flow in the direction of chassis 20. Within the scope of the present invention the high-vacuum pump may also be designed completely as a turbomolecular pump or a molecular pump.

The turbomolecular pumping stage 18, 19 is equipped with an intermediate inlet 38 serving the purpose of admitting the test gas when employing the pump in a counterflow leak detector. The spacing rings 33, 34 located at the level of the intermediate inlet 38 have been modified compared to the remaining spacing rings 32. One or both spacing rings 33, respectively 34 exhibit a reduced outside diameter and form jointly with the housing 11 the circumferential annular channel 41 into which the intermediate inlet 38 opens out. The spacing ring(s) 33, respectively 34 with reduced outside diameter, exhibit moreover passages 42 through which the connection of the pumping chamber of the turbomolecular pumping stage with the intermediate inlet 38 is established. These passages may, for example, be several bores as depicted in the instance of spacing ring 34. An other possibility exists in that a spacing ring 33 is milled such that it section-wise exhibits a reduced (axial) height. The manufacture of passages with a high conductance is thus possible.

A further test gas inlet 45 is located at the level of the molecular pumping stage 9/16, and specifically approximately at half the height of this pumping stage. Finally a further test gas inlet 46 is arranged at the level of the outlet area of the high-vacuum pump 3. Said test gas inlet opens out into the substantially ring-shaped forevacuum chamber 21 which follows the pump cross-section, gap 10.

As in the instance of leak detectors in accordance with the state-of-the-art there follows at the inlet 2 of the leak detector 1 the test gas line 47 which is linked through the line sections 48, 49, 51 each equipped with a valve 52, 53 respectively 54 to the test gas inlets 38, 45, 46. Moreover, the test gas line 47 is linked through line section 55 with the valve 56 with the backing pump 43.

Located at the level of the connection ports 45 and 46 are the further connection ports 57 and 22. These are connected through the line sections 58, 59 each equipped with a valve 61, respectively 62, to the forevacuum line 63 into which also the line section 55 opens out.

At the inlet 2, a device under test which is sprayed from the outside with test gas, or a chamber with one or several devices under test can be connected which each contain test gas. Leak detection is performed in such a manner that initially the device under test, respectively the test chamber is pre-evacuated with valve 56 being open—all other valves are closed. Gross leak detection can commence at a very early stage and specifically by opening the valves 54 and 62.

Almost the entire quantity of gas flowing in the test gas line, in the instance of a closed valve 56 the entire quantity of gas, flows through the forevacuum chamber 21 expediently designed by way of an annular channel. The test gas contained in the flowing gas thereby passes more rapidly and at higher concentration compared to the state-of-the-art into the forevacuum chamber of the high-vacuum pump and thus also more rapidly towards the test gas detector 6.

An even higher level of sensitivity is attained when the valve 54—expediently also the valve 62—is closed and where the valves 53, 61 are opened. Also the valve 56 is—as already detailed—closed. In this operating mode the entire quantity of gas flowing through the test gas line 47 flows approximately at half the height through the molecular pumping stage 9, 16. Located expediently at the level of the connection ports 45, 57 is an annular channel 64 so as to reduce the flow resistance.

Finally the highest sensitivity level of the leak detection process is attained in a basically known manner by opening the valve 52. The pressure of the high-vacuum pump at this point is low (for example $\leq 10^{-1}$ mbar) and thus the diffusion velocity of the test gas is high. And appreciable improvement in the response time would not be attained if the entire gas flowing in the test gas line 47 were to flow through the turbomolecular pumping stage.

Expediently the connection ports 46, 22 (respectively 45, 57) oppose each other so that possibly present test gas can reach, as rapidly as possible, the entire outlet cross section (gap 10 in the depicted example of an embodiment or, if only blade stages are present, the blades on the outlet side). However, very good results are still also attained when the axes of the connections form an angle of 90° (and less).

A significant reduction in the response time is already attained in that for the purpose of connecting the backing pump 43 and the feed in of the gas possibly containing the test gas into the forevacuum area of the high-vacuum pump 1, two separate connection ports 22, 46 are present. This advantage continues to exist also when the connection ports 45 and 57 as well as the related connection lines 49, 58 with their valves 52, 61 are not present.

Figure 2:
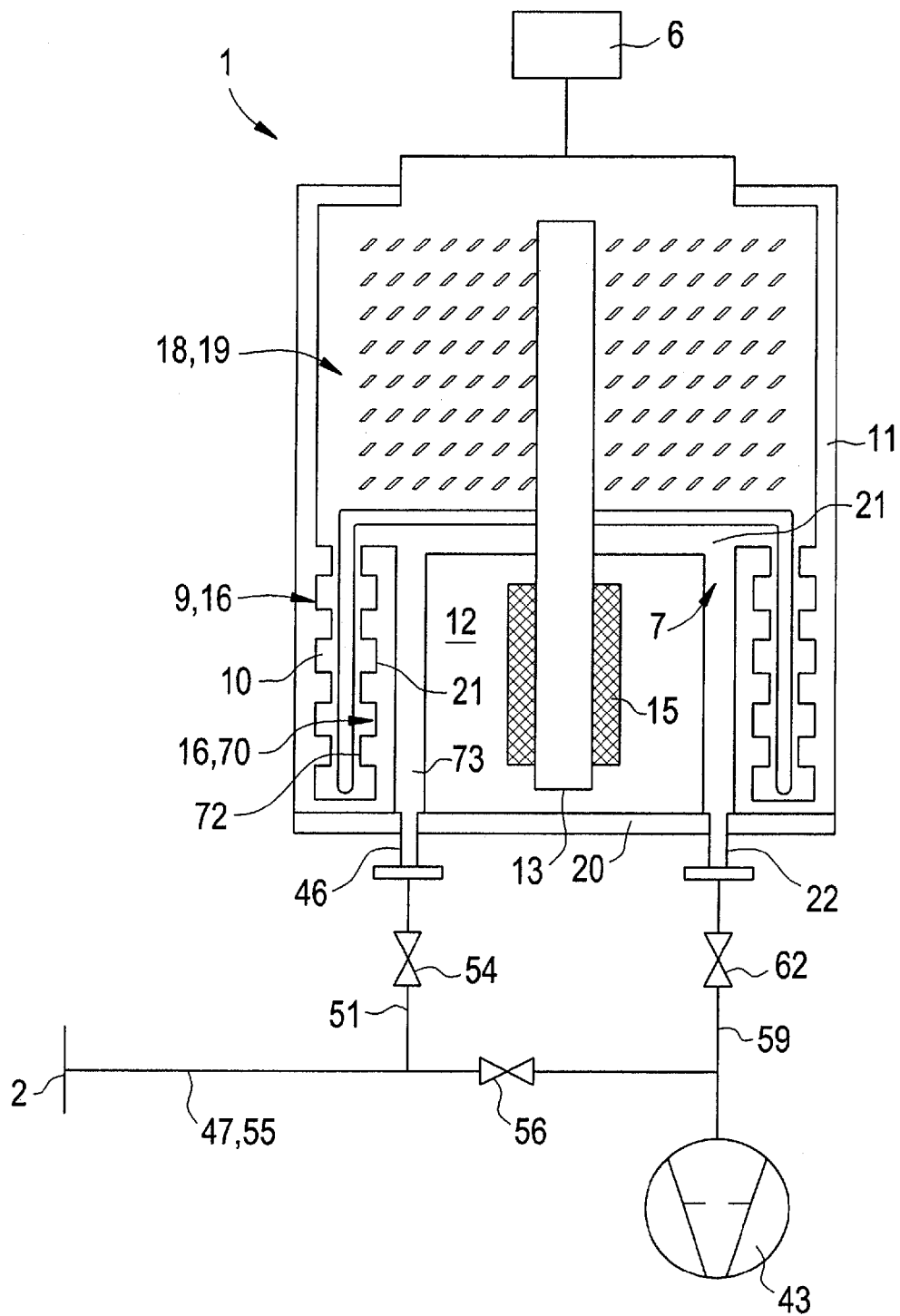
FIGS. 2 and 3 depict a leak detector in accordance with the present invention with a compound pump, the molecular pumping stage of which in turn is of a multiple stage design.

Drawing FIG. 2 depicts highly schematically a leak detection facility in accordance with the present invention with a compound pump. It is equipped with a turbomolecular pumping stage 18, 19 and the molecular pumping stage 9, 16 followed by a further molecular pumping stage. To this end the bell-shaped rotor is equipped with a smooth cylinder section. Assigned to its wall is from the outside the stator section 9, equipped with a thread which together with the outer wall of the rotor 9 forms the pumping gap 10. A further stator section 70 with its thread 71 is assigned to the inside of the rotor cylinder. This molecular pumping section 16, 70 is so designed that the direction of the gases pumped in pumping gap 72 is opposed to the direction of the pumping action in gap 10. From this it results that the discharge area 21 of the high-vacuum pump has a distance from the chassis 20. Said discharge area is located above the bearing bushing 12 and is substantially cylindrical in shape. Via annular chamber 73 and encompassing the bearing bushing 12 it is linked to the connection ports 46, 22 these being arranged at chassis 20. The outlet area 21 and the annular chamber 73 are components of the bearing/motor chamber 7.

In the example of the embodiment in accordance with drawing FIG. 2, the inlet 2 of the leak detector 1 is linked through line 47, 55 with the connection port 46. During the leak detection process, gas possibly containing the test gas flows through the connection port 46 via the annular chamber 73 to the outlet area 21 and from there again through the annular chamber 73 and the connection port 22 to the backing pump 43. So that areas close to the chassis of the annular chamber 73 will not cause any flow short-circuits between the ports 46 and 22, it is expedient that the annular chamber 73 be equipped with separating means not depicted, for example axially extending separating walls, which ensure that the entire quantity of gas entering into connection port 46 is pumped through the outlet area 21 of the high-vacuum pump.

Figure 3:
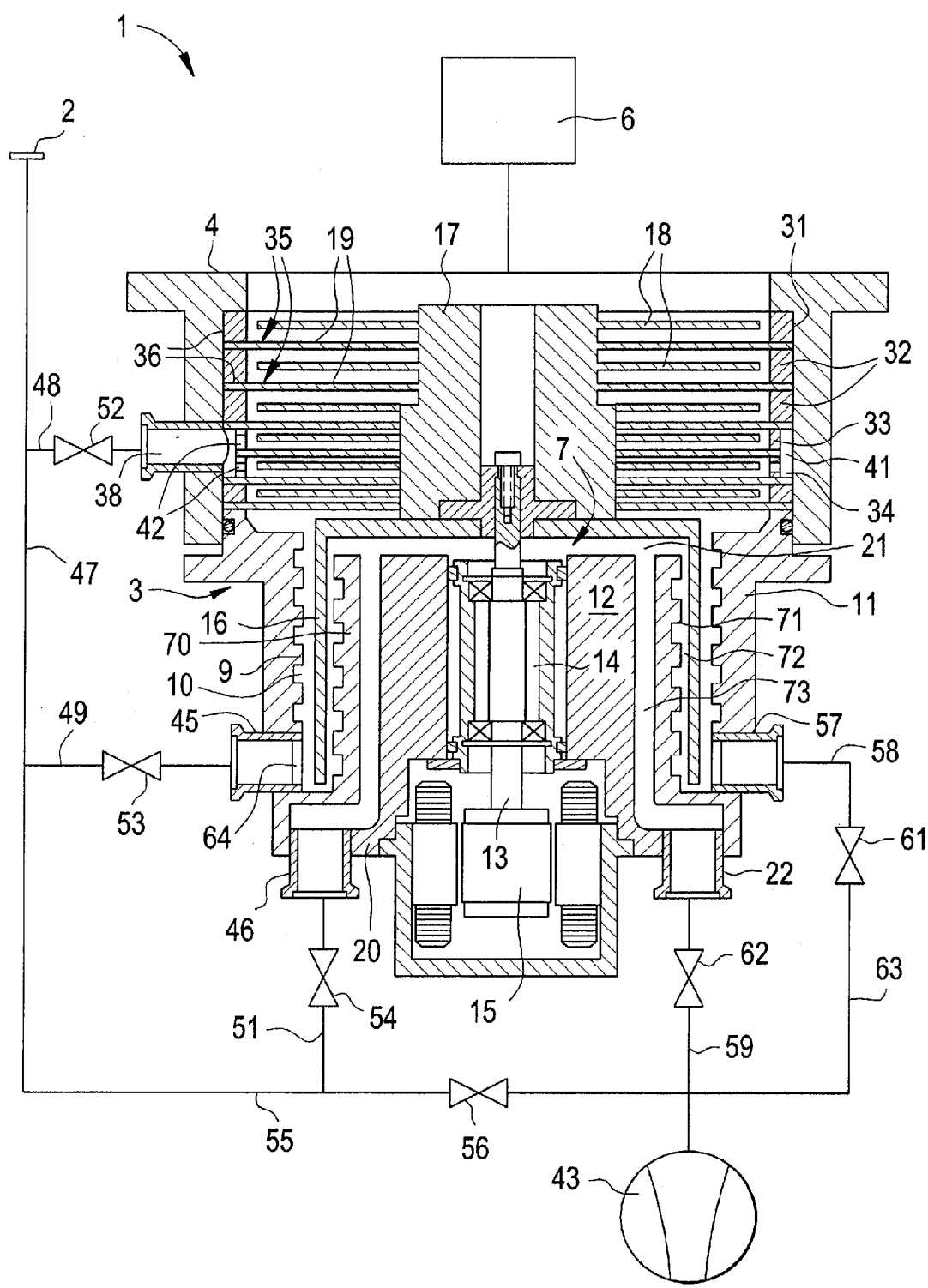

Drawing FIG. 3 depicts an example of an embodiment in which, like in the example of the embodiment in accordance with drawing FIG. 2, the molecular pump is of a two-stage design. Besides the connections 46 and 22 there are—as in the example of the embodiment in accordance with drawing FIG. 1—present the further connections 38, 45 and 57. The connections 45 and 57 open out into the pumping chamber of the two-stage molecular pumping stage, and specifically in the transition area of these stages 16, 9 and 16, 70, i.e. there, where the flowing gases change their direction by approximately 180°.

We claim:

1. A leak detector comprising:
   an inlet;
   a high-vacuum pump;
   a test gas detector connected to an inlet of the high-vacuum pump;
   a backing pump connected to an outlet area of the high-vacuum pump; and
   a test gas line running between the inlet of the leak detector and the backing pump, said test gas line being connected to the outlet area of the high-vacuum pump via a line section and in which the line section and the backing pump are connected via separate connection ports to the outlet area of the high-vacuum pump.

2. A leak detector in accordance with claim 1, wherein an outlet chamber located within a housing of the high-vacuum pump forms the outlet area of the high-vacuum pump and where the housing of the high-vacuum pump is equipped with said two separate connection ports that are connected to the outlet chamber.

3. A leak detector in accordance with claim 1, wherein the outlet chamber is located in the vicinity of a chassis of the high-vacuum pump.

4. A leak detector in accordance with claim 3, wherein the high-vacuum pump is a single flow design and where an inlet flange and the chassis of the high-vacuum pump oppose one another.

5. A leak detector in accordance with claim 2, wherein the outlet chamber has the shape of an annular channel.

6. A leak detector in accordance with claim 1, wherein the high-vacuum pump is a turbomolecular vacuum pump.

7. A leak detector in accordance with claim 6, wherein the turbomolecular vacuum pump is equipped with at least one additional gas inlet.

8. A leak detector in accordance with claim 6, wherein the turbomolecular vacuum pump is equipped with at least two additional gas inlets.

9. A leak detector in accordance with claim 8, wherein there is provided at the same level as one of said additional gas inlets, a further connection port that is linked to the backing pump.

10. A leak detector in accordance with claim 1, wherein the high-vacuum pump is a compound vacuum pump having a turbomolecular stage and a molecular pumping stage.

11. A leak detector in accordance with claim 10, wherein at the level of the turbomolecular pumping stage, an additional test gas inlet is provided.

12. A leak detector in accordance with claim 10, wherein at the level of the molecular pumping stage, preferably at half the height of this stage, a test gas connection port is provided.

13. A leak detector in accordance with claim 12, wherein at the same level as the test gas connection port, an additional connection port is provided which is linked to the backing pump.

14. A leak detector in accordance with claim 13, wherein an annular channel is located at the level of the additional test gas connection ports.

15. A leak detector in accordance with claim 10, wherein the molecular pumping stage is of a multi-stage design.

16. A leak detector in accordance with claim 15, wherein there is connected to a first molecular pumping stage with a pumping action axially in the direction of the chassis, a second molecular pumping stage which has an opposing direction of the pumping action such that the outlet area of the high-vacuum pump has a distance from the chassis and is connected through an annular chamber to the connection port to which the backing pump is connected and where also the connection port connected via the valve with the test gas line is connected to the annular chamber.

17. A leak detector in accordance with claim 16, wherein the outlet area of the high-vacuum pump is defined by a substantially cylindrical chamber into which the second molecular pumping stage opens out and which is connected to the annular chamber.

18. A leak detector in accordance with claim 13, wherein each of said connection ports located at the same height are arranged with respect to the longitudinal axis of the high-vacuum pump on the side and form an angle ranging between 35° and 180°.

19. A leak detector in accordance with claim 18, wherein the connection ports oppose each other.

* * * * *